(12) United States Patent
Das et al.

(10) Patent No.: US 8,691,173 B2
(45) Date of Patent: Apr. 8, 2014

(54) COMPOSITION FOR TREATMENT OF WATER

(75) Inventors: Kalyan Kumar Das, Pune (IN); Chetan Premkumar Malhotra, Pune (IN)

(73) Assignee: Tata Consultancy Services Ltd., Mumbai (IN)

( * ) Notice: Subject to any disclaimer, the term of this patent is extended or adjusted under 35 U.S.C. 154(b) by 246 days.

(21) Appl. No.: 13/055,495

(22) PCT Filed: Dec. 8, 2008

(86) PCT No.: PCT/IN2008/000821
§ 371 (c)(1),
(2), (4) Date: Jan. 24, 2011

(87) PCT Pub. No.: WO2010/010571
PCT Pub. Date: Jan. 28, 2010

(65) Prior Publication Data
US 2011/0117201 A1    May 19, 2011

(30) Foreign Application Priority Data
Jul. 24, 2008  (IN) .......................... 1569/MUM/2008

(51) Int. Cl.
*B01J 20/20*      (2006.01)
*B01D 39/00*     (2006.01)
*B01J 20/02*      (2006.01)
*C02F 1/28*       (2006.01)

(52) U.S. Cl.
CPC ................... *B01J 20/20* (2013.01);
*B01J 20/0233* (2013.01);
*B01D 39/00* (2013.01);
*C02F 1/28* (2013.01)
USPC .......................................... 423/413; 210/656

(58) Field of Classification Search
CPC ............. C02F 1/28; B01J 20/28; B01J 20/32; B01J 20/323204; B01J 20/06; B01D 39/00
USPC .................................. 502/400, 413; 977/795
See application file for complete search history.

(56) References Cited

FOREIGN PATENT DOCUMENTS

| CN | 1960948 | 5/2007 |
|---|---|---|
| CN | 101160169 A | 4/2008 |
| EP | 0 269 769 A1 | 6/1988 |
| WO | WO 2005/095285 A1 | 10/2005 |
| WO | WO 2006/110632 | 10/2006 |

OTHER PUBLICATIONS

Farook, Adam et al., "Silver modified porous silica from rice husk and its catalytic potential," Journal of Porous Materials, Kluwer Academic Publishers, BO, vol. 15, No. 4, May 12, 2007, pp. 433-444.
Chang, F.W. et al., "Ethanol Dehydrogenation Over Copper Catalysts on Rice Husk Ash Prepared by Ion Exchange," Applied Catalysis A: General, Elsevier Science, Amsterdam, NL, vol. 304, May 10, 2006, pp. 30-39.
Chang, F.W., et al., "Dehydrogenation of Ethanol Over Copper Catalysts on Rice Husk Ash Prepared by Incipient Wetness Impregnation," Applied Catalysis A: General, Elsevier Science, Amsterdam, NL, vol. 246, No. 2, Jun. 30, 2003, pp. 253-264.
International Search Report and Written Opinion issued in PCT International Application No. PCT/IN2008/000821, mailed on Jul. 3, 2009.

*Primary Examiner* — Stanley Silverman
*Assistant Examiner* — Richard M Rump
(74) *Attorney, Agent, or Firm* — Klarquist Sparkman, LLP

(57) ABSTRACT

The invention relates to a composition for treatment of water comprising rice husk ash and at least one bactericidal agent bonded to the rice husk ash. The bactericidal agent bonded to the rice husk ash is preferably silver and more particularly the bactericidal agent is nano silver. The invention also relates to a method of water purification using a composition comprising rice husk ash and at least one bactericidal agent bonded to the rice husk ash.

14 Claims, No Drawings

COMPOSITION FOR TREATMENT OF WATER

CROSS-REFERENCE TO RELATED APPLICATIONS

This application is a filing under 35 U.S.C. §371 based on PCT/IN2008/000821, filed on Dec. 8, 2008, which claims priority to Indian Application Serial No. 1569/MUM/2008, filed on Jul. 24, 2008, each of which applications are incorporated herein in their entirety.

FIELD

The invention relates to the treatment of water. More particularly the invention relates to a composition for treatment of water to remove biological contaminants.

DESCRIPTION OF RELATED ART

Clean potable water is a basic human requirement. However, a large portion of the world's population, especially those living in developing counties do not have access to clean potable water.

Growing population, lack of sanitary condition, poverty, poor planning, industrial pollution, over exploitation of natural water and national disasters are the main reasons of contamination of water. This contaminated water is the source of many diseases such as diarrhea, dysentery, fever, abdominal pain, and constipation, caused due to bacterial contamination transmitted through water. In India for example, as per the data collected by the Ministry of Health and Family Welfare, in 2003 there were 10.5 million cases of diarrhea with 4709 deaths resulting majorly due to consumption of contaminated water. According to the World Health Organization, the provision of safe water alone can reduce diarrheal and enteric disease by up to 50%, even in the absence of improved sanitation and other hygiene measures.

Many water purification devices like in-line (electricity operated) devices, terminal end devices including counter top and faucet mounted filtration and self-contained batch system including gravity fed systems have been introduced into the market. However, many communities of the developing countries do not have access to piped water or reliable electricity connection to make use of inline or electrically driven purification units. They also do not have access to central water purification units installed near the water bodies from where they source their water. Moreover, the people in these communities cannot afford the point-of-use water purifies currently available in the market. The maintenance requirements and the high cost of consumables of these purifiers pose further hurdles for the adoption of these devices.

Rice husk ash has been used as a water purifier but the results obtained are not consistent over time, the rice husk ash is not able to remove all bacteria, and the filter devices required for adequate filtration tend to be bulky.

Thus there is a need for a water purification composition that is inexpensive, easy to use and effective in removing bacterial contamination from drinking water.

SUMMARY

The invention relates to a composition for treatment of water comprising rice husk ash and at least one bactericidal agent bonded to the rice husk ash. The invention also relates to a composition for treatment of water comprising rice husk ash and a mixture of at least two bactericidal agents bonded to the rice husk ash.

The composition comprises at least ten percent by weight of rice husk ash. The composition comprises at least 0.01 percent by weight of a bactericidal agent.

The bactericidal agent may be any one of silver, copper and their compounds and preferably the bactericidal agent is silver. The bactericidal agent is preferably nano silver.

The rice husk ash particle size is in the range of 38 to 850 microns and preferably the particle size is less than 425 microns. The nano silver particles are in the range of 10 nm to 500 nm and preferably in the rage of 25 to 75 nm.

The invention also relates to a composition for treatment of water comprising of at least two portions of rice husk ash wherein each portion of the composition is bonded with a different bactericidal agent. At least one of the bactericidal agents is preferably nano silver and the portion of the composition containing the nano silver particles is at least ten percent by weight of the composition.

The invention also relates to a composition for treatment of water comprising of at least two portions of rice husk ash wherein each portion of the composition is bonded with a different amount of a bactericidal agent. Each portion is possibly bonded with the same bactericidal agent The invention also relates to a composition for treatment of water comprising of at least two portions of rice husk ash wherein only one portion of the composition is bonded with a bactericidal agent.

The invention also relates to a composition for treatment of water comprising of two or more portions with at least one portion including rice husk ash to which a bactericidal agent is bonded and the other portion including a material capable of water purification.

The invention also relates to a water purification method of removing bacteria from water comprising passing the water through a composition for treatment of water, the composition comprising rice husk ash and at least one bactericidal agent bonded to the rice husk ash.

DETAILED DESCRIPTION

To promote an understanding of the principles of the invention, reference will be made to the embodiment and specific language will be used to describe the same. It will nevertheless be understood that no limitation of scope of the invention is thereby intended, such alterations and further modifications in the described composition and such further applications of the principles of the inventions as disclosed therein being contemplated as would normally occur to one skilled in art to which the invention relates.

Rice husk is a perennially renewable agro-waste available at virtually no cost wherever rice paddy is grown. On combustion, the rice husk ash residue contains 75-95% silica, 4-12% carbon and the rest comprising various metal oxides such as alkali, alkali earth metal and ion oxides. On account of its crypto-crystalline or amorphous and highly porous structure, the BET (Brunauer Emmett Teller) surface area of rice husk ash can be as high as 80-100 square meters per gram, depending on the conditions employed for the combustion of rice husk. Its high surface area and porosity make rice husk ash an effective filtration medium that removes particulate matter as well as color and odor from water. Rice husk ash is a highly adsorbent material and is capable of removing bacteria as well as suspended particles from the water.

Rice husk ash is thus a suitable water purifier material as it contains an activated surface with abundant pores, has a large surface area, is easily available and is cheap.

The rice husk ash used for the composition of treatment of water may be any rice husk ash that is produced by burning rice husk. The rice husk ash may be produced by burning rice husk in heaps, in a step grate furnace, fluidized bed furnace or tube-in-basket (TiB) burner. The rice husk ash may also be obtained from boilers and brick kiln, provided it is free of unburned husk and wood tar, grit, stone, and fused lumps of silica. The particle size of rice husk ash may be in the range of 38 to 850 microns and preferably the particle size is less than 425 microns.

Bactericidal agents are known to remove bacteria from water. The bactericidal agent silver is particularly useful in removing bacteria from water.

A composition for treatment of water is described. More particularly, a composition for treatment of water to remove bacterial contaminants is described. The composition for treatment of water comprises of rice husk ash and a bactericidal agent bonded to the rice husk ash.

The composition for treatment of water comprises of rice husk ash and at least one bactericidal agent bonded to the rice husk ash. More than one bactericidal agent may be bonded to the rice husk ash or a mixture of one or more bactericidal agents may be bonded to the rice husk ash.

The composition for treatment of water comprises of at least ten percent by weight of rice husk ash and preferably sixty percent. The composition for treatment of water comprises at least 0.01% by weight of a bactericidal agent.

The bactericidal agent may be any compound with bactericidal property including but not limited to silver, copper and their compounds.

As used herein the bonding of a bactericidal agent to the rice husk ash includes a chemical bonding, adsorption or trapping of bactericidal particles in the pores of the rice husk ash.

The composition for treatment of water comprises rice husk ash and silver particles as a bactericidal agent bonded to the rice husk ash. In accordance with an embodiment the composition for treatment of water comprises rice husk ash and nano silver particles as a bactericidal agent bonded to the rice husk ash.

The size of the nano silver particles may be in the range of 10 nm to 500 nm and the size of nano silver particles is preferably be in the range of 25 to 75 nm.

Any known method of treating a substrate may be used to apply the bactericidal agent to the rice husk ash. Such method for example may include mixing in a container the rice husk ash with a bactericidal agent till the bactericidal agent is coated on or adsorbed on or bonded with the rice husk ash.

In accordance with an aspect a composition for treatment of water is described, wherein the composition comprises of two or more portions with each portion comprising of rice husk ash bonded with a different bactericidal agent. For example, the composition may include two portions of rice husk ash with a first portion bonded with silver and the other portion bonded with copper. The composition may also include two portions of rice husk ash with a first portion bonded with silver and the other portion bonded with nano silver particles. The portions of rice husk ash may or may not be equal, though it is preferred that the portion of rice husk ash containing nano silver particles is at least ten percent by weight of the composition for effective removal of bacteria from the water.

In accordance with an aspect the composition comprises of two or more portions with each portion comprising of rice husk ash bonded with a different amount of a bactericidal agent. The bactericidal agent may be the same for all portions or the bactericidal agent may be different for the portions. For example, the composition may include two portions with a first portion including 0.01% by weight of a bactericidal agent and the other portion including 0.1% by weight of a bactericidal agent. The composition may also include two portions with a first portion including 0.01% by weight of a first bactericidal agent and the other portion including 0.1% by weight of a second bactericidal agent. By way of specific example, the composition may include two portions of rice husk ash with a first portion including 0.1% by weight of nano silver and the second portion including 0.6% by weight of nano silver. The portions of rice husk ash may or may not be equal, though it is preferred that the portion of rice husk ash containing the larger percentage by weight of nano silver particles is at least ten percent by weight of the composition for effective removal of bacteria from the water.

In accordance with an aspect, the composition for treatment of water comprises of two or more portions with at least one portion including rice husk ash to which a bactericidal agent is bonded. The portion containing the bactericidal agent includes at least 0.1% by weight of the bactericidal agent. The composition may also include at least one other portion of a filter material including rice husk ash or a stabilizing agent, a filler material or any known filtration material such as charcoal or pebbles. For example, the composition may include two portions with a first portion comprising of rice husk ash to which a bactericidal agent is bonded and the other portion including rice husk ash. The composition may also include two portions with a first portion comprising of rice husk ash to which a bactericidal agent is bonded and the other portion including ground charcoal. The other portion may also include iodine containing resin coated on a suitable substrate, activated carbon, activated carbon treated with nano silver, terra-cotta treated with nano silver, fired clay treated with nano silver, a mixture of RHA and a suitable binder with or without nano silver and other materials suitable for water purification. The portions of the composition may or may not be equal, though it is preferred that the portion of rice husk ash containing the bactericidal agent is at least ten percent by weight of the composition for effective removal of bacteria from the water.

A method of treatment of water for removal of bacterial content is disclosed. The method includes passing the water over a composition for treatment of water at a specified flow rate wherein the composition includes rice husk ash to which a bactericidal agent is bonded. By way of specific example, the method includes passing the water over a composition for treatment of water at a flow rate that ensures that the water remains for a sufficient period over the composition, the composition including rice husk ash to which nano silver particles as a bactericidal agent are bonded.

The composition of rice husk ash and the bactericidal agent synergistically work together in removing the bacteria content from water. In particular, the rice husk ash bonded with nano silver particles is particularly effective in removing bacterial content from water. The composition as described by this document purifies water efficiently and economically.

The following experiment is provided to explain and illustrate the use of the composition for water treatment in a water purifier and the results are tabulated for the first twenty eight days. The composition used in the example was rice husk ash coated with nano silver particles where the weight of the silver was 0.8 grams for 130 grams of rice husk ash.

TABLE 1

| Day | Flowrate (lit/hr) | Cumulative Water Passed (lit) | Avg. Input E-Coli Plate Count (CFU/ml) | Output E-Coli Plate Count (CFU/ml) |
|---|---|---|---|---|
| Day 1 | 0.60 | 0 | 148333 | 0, 0 |
| Day 3 | 2.50 | 40 | 239500 | 0, 0 |
| Day 4 | 1.60 | 52 | 220667 | 0, 0 |
| Day 5 | 2.50 | 86 | 217667 | 0, 0 |
| Day 6 | 2.96 | 136 | 221667 | 0, 0 |
| Day 7 | 2.58 | 205 | 151333 | 0, 0 |
| Day 8 | 3.33 | 239 | 207000 | 0, 0 |
| Day 9 | 3.34 | 295 | 222667 | 0, 0 |
| Day 10 | 3.63 | 358.5 | 222667 | 0, 0 |
| Day 11 | 3.72 | 432.4 | 213000 | 0, 0 |
| Day 12 | 3.26 | 505.4 | 219333 | 0, 0 |
| Day 13 | 3.38 | 564.4 | 207667 | 0, 0 |
| Day 14 | 3.48 | 628.9 | 245667 | 0, 0 |
| Day 15 | 3.23 | 695.3 | 275000 | 0, 0 |
| Day 17 | 3.1 | 710.3 | 237000 | 0, 0 |
| Day 18 | 3.24 | 772.9 | 228333 | 0, 0 |
| Day 19 | 3.42 | 841.9 | 271000 | 0, 0 |
| Day 20 | 3.38 | 912.9 | 197000 | 0, 0 |
| Day 21 | 3.53 | 994.9 | 298667 | 0, 0 |
| Day 22 | 3.22 | 1059.9 | 312667 | 0, 0 |
| Day 23 | 3.16 | 1117.9 | 344000 | 0, 0 |
| Day 24 | 3.3 | 1171.9 | 277667 | 0, 0 |
| Day 25 | 3.3 | 1229.2 | 309000 | 0, 0 |
| Day 26 | 3.24 | 1298.2 | 314000 | 0, 0 |
| Day 27 | 3.46 | 1367.2 | 213333 | 0, 0 |
| Day 28 | 3.63 | 1437.2 | 291667 | 0, 0 |
| Day 30 | 3.37 | 1455.2 | 297667 | 0, 0 |
| Day 32 | 3 | 1560.4 | 273000 | 0, 1 |

We claim:

1. A composition for treatment of water, the composition comprising:
   rice husk ash having a Braunauer Emmett Teller specific surface area of not more than 100 m²/g and a silica content of 75% to 95%; and
   at least one nano silver bactericidal agent bonded to the rice husk ash, the nano silver bactericidal agent having a particle size ranging from about 10 nm to about 500 nm.

2. A composition for treatment of water as claimed in claim 1 wherein a mixture of at least two bactericidal agents is bonded to the rice husk ash.

3. A composition for treatment of water as claimed in claim 1 wherein at least ten percent by weight of the rice husk ash is present.

4. A composition for treatment of water as claimed in claim 1 wherein at least 0.01 percent by weight of the nano silver bactericidal agent is present.

5. A composition for treatment of water as claimed in claim 1 wherein the composition comprises an additional bactericidal agent bonded to the rice husk ash and wherein the additional bactericidal agent is copper.

6. A composition for treatment of water as claimed in claim 1 wherein the rice husk ash has a particle size in the range of about 38 to 850 microns.

7. A composition for treatment of water as claimed in claim 1 comprising of at least two portions of rice husk ash wherein each portion of the composition is bonded with a different bactericidal agent.

8. A composition for treatment of water as claimed in claim 7 wherein at least one of the bactericidal agents is nano silver and the portion of the composition containing the nano silver particles is at least ten percent by weight of the composition.

9. A composition for treatment of water as claimed in claim 1 comprising of at least two portions of rice husk ash wherein each portion of the composition is bonded with a different amount of a bactericidal agent.

10. A composition for treatment of water as claimed in claim 9 wherein each portion is bonded with the same bactericidal agent.

11. A composition for treatment of water as claimed in claim 1 comprising of at least two portions of rice husk ash wherein only one portion of the composition is bonded with a bactericidal agent.

12. A composition for treatment of water as claimed in claim 9 wherein the bactericidal agent is nano silver.

13. A composition for treatment of water as claimed in claim 1 comprising of two or more portions with at least one portion including rice husk ash to which a bactericidal agent is bonded and the other portion including a material capable of water purification.

14. A water purification method of removing bacteria from water comprising passing the water through a composition for treatment of water, the composition comprising:
   rice husk ash having a Braunauer Emmett Teller specific surface area of not more than 100 m²/g and a silica content of 75% to 95%; and
   at least one nano silver bactericidal agent bonded to the rice husk ash, the nano silver bactericidal agent having a particle size ranging from about 10 nm to about 500 nm.

* * * * *